March 19, 1935.   S. COLLIER   1,994,979
FRICTION MATERIAL
Filed July 14, 1930    2 Sheets-Sheet 1

INVENTOR.
Simon Collier
BY D. N. Halstead
ATTORNEY.

INVENTOR.
Simon Collier
BY D. H. Halstead
ATTORNEY.

Patented Mar. 19, 1935

1,994,979

UNITED STATES PATENT OFFICE 1,994,979

FRICTION MATERIAL

Simon Collier, Waukegan, Ill., assignor to Johns-Manville Corporation, New York, N. Y., a corporation of New York Application July 14, 1930, Serial No. 467,990

11 Claims. (Cl. 154—2)

This invention relates to friction elements such as brake shoes or linings and more particularly to that class of friction blocks or linings comprising fibrous material intimately admixed with a matrix or binder, and hardened by heat and pressure.

The primary object of the invention is the provision of an improvement on the composition lining of the type described in U. S. patent to Frank A. Headson, Number 1,264,924, dated May 7, 1918. The type disclosed by that patent comprises a matrix such as a vulcanizable rubber compound admixed with a reinforcing material such as short pieces of asbestos yarn heterogeneously arranged so as to extend in all directions in the matrix. Composition facings of this type lack high tensile strength and consequently thin sections thereof such as the sections underlying the means for fastening the facing on the brake head are liable to crack off under service conditions. Heretofore it has been proposed to secure such facings to a backing of metal. However, this expedient has been found to be objectionable due among other reasons to the difficulty of securing the facing securely to the metal, the liability of the metal back to cause scoring upon wearing away of the facing, and the expense involved.

I have found that these difficulties may be largely obviated by integrally uniting the facing with a backing composed of material of relatively great tensile strength and having frictional characteristics of the same order as the facing. According to the preferred embodiment of my invention, the backing consists of a multiplicity of thin layers of a hardened mixture of a rubber compound and fibrous asbestos material associated so that a predominating amount of the fibers extend in the same direction.

Figure 1:
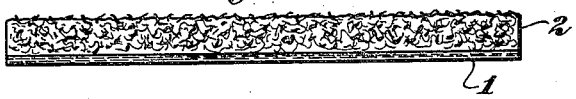
Figure 2:
Figure 3:
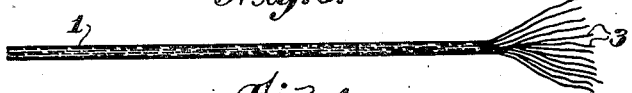
Figure 4:
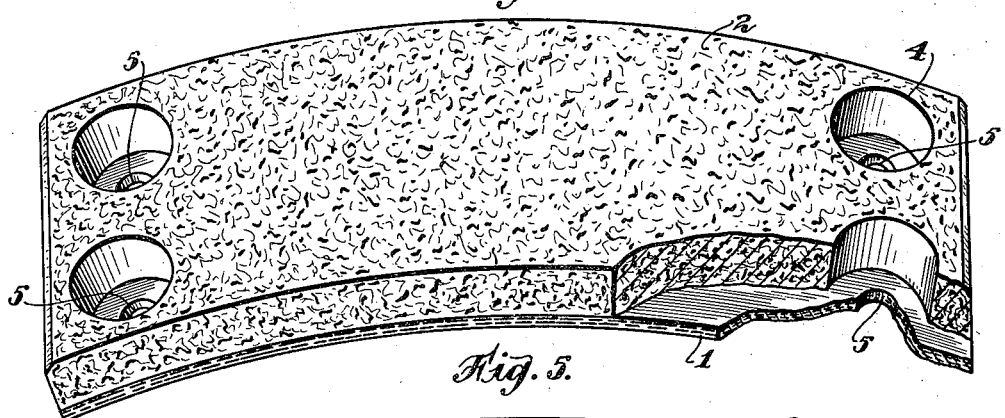
Figure 5:
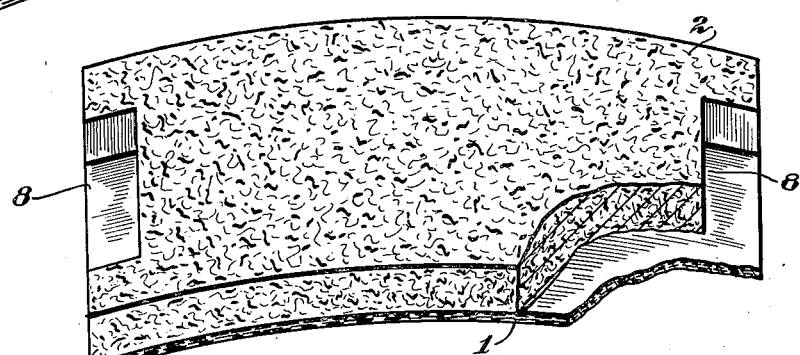
Figure 6:
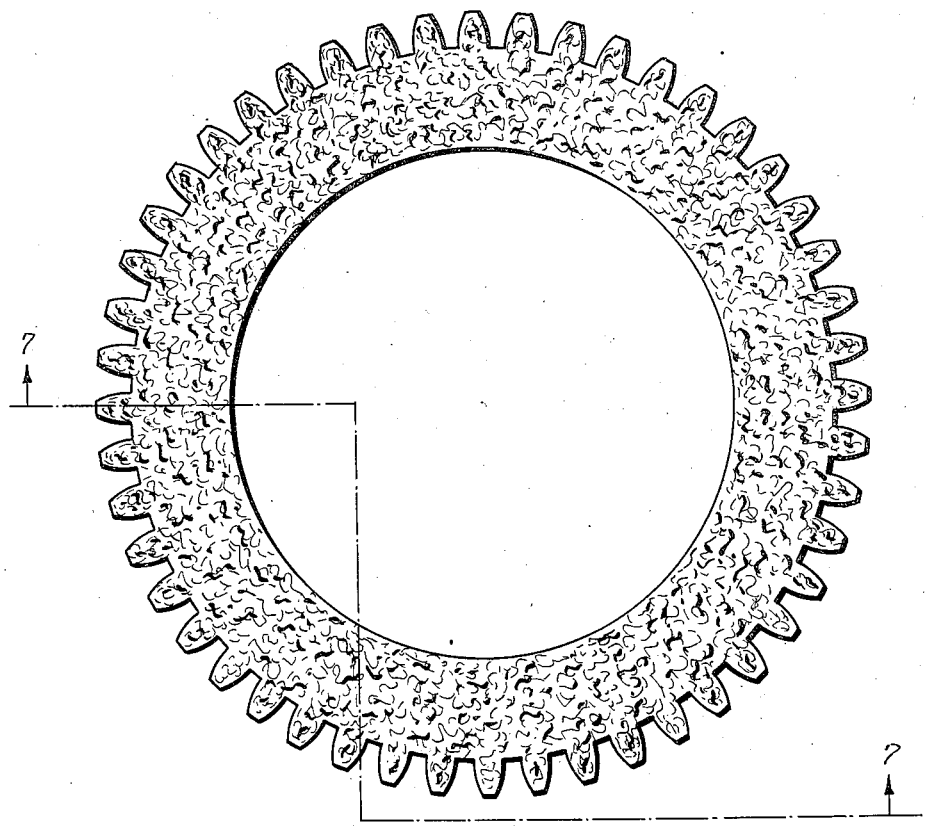
Figure 7:
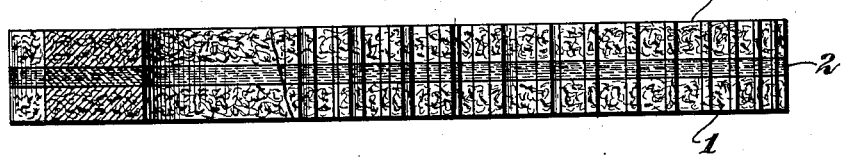

That embodiment of my invention chosen for the purpose of illustration is shown in the accompanying drawings, in which Fig. 1 is a longitudinal sectional view of my improved friction element during one stage of its manufacture while Fig. 2 shows a similar view during a later stage. Fig. 3 shows a longitudinal sectional view through my backing element, pulled apart at one end to better indicate its structure. Figs. 4 and 5 are perspective views with portions broken away of two complete brake elements made in accordance with my invention. Fig. 6 shows a side elevation of a clutch ring gear made in accordance with my invention while Fig. 7 is a side view thereof with parts thereof shown in section taken along line 7—7 of Fig. 6.

The backing sheet 1 is preferably formed of relatively strong material capable of being integrally united with the composition facing 2 and having frictional properties similar to the facing. The preferred form of backing comprises a hardened mixture of a binder such as rubber and incombustible fibrous material associated so as to provide a material of relatively high tensile strength. A backing of this character may be provided by first forming a plastic mixture of asbestos fibers, a rubber compound including sulfur, fillers, etc., and a suitable solvent to provide the required plasticity. The asbestos fibers preferably comprise about 50 to 75% by weight of the mixture. This mixture is then fed into the bight of a "sheeter" comprising a heated drum and a cooperating cold roll. As the heated drum revolves, successive coatings of the plastic mass adhere thereto. Automatic means are provided for the gradual widening of the bight between the rolls as the sheet is built up. The product thus formed consists of a multiplicity of spiral layers or films, each of which has a predominating amount of fibrous material extending in the same direction. The successive layers are consolidated and hence are not perceptible in the finished sheet. However, the semi-laminated structure may be made apparent by soaking an end of the sheet with solvent after which the layers 3 may be separated as indicated on the right side of Fig. 3. After the sheet has reached the desired thickness it is slit and removed from the roll. The sheet is then roughened either by hand or mechanically and given a coat of rubber cement preparatory to having the composition facing applied thereto.

The composition facing to which the backing is applied in accordance with my invention, may be any one of a variety of friction materials known to the art. However, it is especially applicable to friction materials of the type described in the Headson patent mentioned above.

In making the facing material, a mixture is first formed of a rubber compound including sulfur, fillers, etc., a solvent, and fibrous reinforcing material as for instance ground scrap asbestos linings in the proportions and according to the method described in the Headson patent.

This mixture is then spread onto the backing sheet in suitable thickness. Next, the facing stock is pressed down firmly and evenly distributed onto the backing sheet as shown in Fig. 1 by passing the material thru calender rolls or by pressing it in a mold. Apertures 5 (Fig. 4) may be provided in the backing sheet thru which the facing stock is extruded and in effect keyed to the backing.

This pressed material is then placed in a dryer where it is thoroughly dried. From there it is transferred to a mold which is curved or otherwise shaped to give the product its desired form, and partially vulcanized. After this partial vulcanization, it has the form shown in Fig. 2. In this single vulcanization operation I simultaneously accomplish the vulcanization of the facing portion and the backing and provide the integral connection between them.

The next step consists in cutting and trimming this partly finished composite brake-element into the desired shape and in grinding it to the proper width and thickness. It is then placed in oven molds where the vulcanization process is completed. After complete vulcanization, the brake block can be chamfered or otherwise treated as to final finish.

I thus produce a composite friction brake-element or block having highly effective braking qualities and which is toughened and strengthened by having a heat-resisting, non-abrading, stiffening friction backing sheet associated therewith. The reinforcing backing sheet provides for any lack of tensile strength inherent in the facing portion of the brake-block and therefore my device has ample strength when fastened to the brake-shoe.

My new friction element or brake-block may be finally finished to give it the shape and design shown in Fig. 4 which is known as a full coverage block and is made by having apertures 4 drilled through the facing portion but stopping short of the backing. These apertures are large enough in diameter to accommodate the means for securing the block such as rivets, etc.

Fig. 5 shows a slightly different form of brake-block which is known as the keeper type and this type is provided with recesses at its ends. These recesses are adapted to co-operate with devices on the brake-shoe to hold the block in place on the shoe.

The construction shown in Figs. 6 and 7 illustrates the application of my invention to clutch rings of the type wherein gear teeth are formed integrally with the ring. The ring is of a built-up construction made similarly to the lining above described except that the composition facing 1 is preferably applied to both sides of the reinforcing backing 2.

What I claim is:

1. A friction element comprising a facing composed of a hardened mixture of rubber and short pieces of fibrous asbestos material, said fibers extending in all directions with respect to each other, and a backing vulcanized to said facing composed of a multiplicity of consolidated layers of a mixture comprising rubber and fibrous asbestos and having a predominating amount of the fibers in each of said layers extending generally in the same direction.

2. A composite brake-block having two integrally united layers of composition friction material, asbestos fibers incorporated into each layer thereof, one layer having the asbestos fibers extending in all directions, and the other layer having the asbestos fibers extending predominately in the same direction.

3. A process of manufacturing a friction element which comprises forming a relatively strong sheet including a vulcanizable rubber compound and fibrous asbestos disposed so that a predominating amount thereof extend in the same general direction in the sheet and parallel to the surface thereof, distributing a mixture comprising a vulcanizable rubber compound and fibrous asbestos material heterogeneously arranged in the compound over the surface of the backing sheet, and integrally uniting the product thus formed by vulcanization.

4. A composite friction element adapted for use as brake lining and the like consisting of a facing layer of composition friction material characterized by relatively low tensile strength, integrally united with a reinforcing backing layer comprising a mixture of binding material capable of integral union with the composition facing, and fibers, said fibers being disposed in the binding material so that a predominating amount thereof extend in the same general direction and parallel to the surface of the backing of greatest area, said backing being characterized by relatively high tensile strength compared to that of the facing layer.

5. A process of manufacturing a friction element which comprises forming a relatively strong backing sheet including a vulcanizable rubber compound and fibrous asbestos disposed so that a predominating amount thereof extends in the same general direction in the sheet and parallel to the surface thereof, distributing a mixture comprising a vulcanizable rubber compound, solvent, and fibrous asbestos material heterogeneously arranged in the mixture over the surface of the backing sheet, pressing the mixture thus distributed onto the backing, drying the resulting product and thereafter integrally uniting the two layers thereof by vulcanization.

6. In a friction mechanism, a composite block comprising a wearing face layer of relatively low density comprising unwoven asbestos and a reinforcing back layer of relatively higher density comprising bonded asbestos, the static frictional coefficient of the back being equal to or greater than the kinetic frictional coefficient of the face.

7. A composite brake block comprising a wearing face layer of bonded asbestos of relatively low density and a reinforcing non-metallic back of relatively higher density.

8. A composite brake block comprising a wearing face layer of bonded asbestos of relatively low density and a reinforcing back of relatively higher density, the composition of both layers being substantially similar.

9. A composite brake block comprising a wearing face of bonded asbestos of relatively low strength and hardness and a fibrous reinforcing back of relatively higher strength and hardness.

10. A composite brake block comprising a wearing face of bonded asbestos of relatively low strength and hardness and a fibrous reinforcing back of relatively higher strength and hardness, the latter being perforated to receive interlocking sections of the wearing compound.

11. A composite brake block comprising a wearing face of bonded asbestos of relatively low strength and hardness and a fibrous reinforcing back of bonded asbestos of relatively higher strength and hardness.

SIMON COLLIER.